United States Patent [19]

Sakagami et al.

[11] Patent Number: 4,872,154
[45] Date of Patent: Oct. 3, 1989

[54] METHOD FOR RECORDING INDICIA FOR INDICATING PRESENCE OR ABSENCE OF ERROR IN MEDIUM AFTER ERROR CHECKING AND APPARATUS THEREFOR

[75] Inventors: Wataru Sakagami; Katsumi Iijima, both of Yokohama, Japan

[73] Assignee: Canon Kabushiki Kaisha, Tokyo, Japan

[21] Appl. No.: 98,066

[22] Filed: Sep. 17, 1987

[30] Foreign Application Priority Data

| Sep. 22, 1986 | [JP] | Japan | 61-222171 |
| Sep. 22, 1986 | [JP] | Japan | 61-222172 |
| Feb. 20, 1987 | [JP] | Japan | 62-35898 |
| Feb. 20, 1987 | [JP] | Japan | 62-35899 |
| Mar. 31, 1987 | [JP] | Japan | 62-78014 |

[51] Int. Cl.⁴ .............................................. G11B 7/00
[52] U.S. Cl. ................................... 369/54; 369/275
[58] Field of Search ............... 360/2; 369/14, 15, 53, 369/54, 100, 111, 275, 59, 32; 235/470, 494

[56] References Cited

U.S. PATENT DOCUMENTS

| 3,885,094 | 5/1975 | Russell | 369/111 |
| 4,145,758 | 3/1979 | Drexler et al. | 369/54 |
| 4,308,612 | 12/1981 | Miyauchi et al. | 369/54 |
| 4,433,403 | 2/1984 | Baba et al. | 369/111 |
| 4,494,226 | 1/1985 | Hazel et al. | 369/54 |
| 4,535,439 | 8/1985 | Satoh et al. | 369/275 |
| 4,545,044 | 10/1985 | Satoh et al. | 369/54 |
| 4,571,716 | 2/1986 | Szerlip | 369/53 |
| 4,606,016 | 8/1986 | Verboom et al. | 369/54 |
| 4,606,018 | 8/1988 | Sugiki et al. | 369/275 |
| 4,611,314 | 9/1986 | Ogata et al. | 369/111 |
| 4,672,483 | 6/1987 | Kawada | 360/51 |
| 4,695,993 | 9/1987 | Takagi et al. | 369/54 |
| 4,742,507 | 5/1988 | Kuroki et al. | 369/54 |
| 4,788,672 | 11/1988 | Toyooka et al. | 369/111 |

FOREIGN PATENT DOCUMENTS

| 0046323 | 2/1982 | European Pat. Off. . |
| 0127732 | 12/1984 | European Pat. Off. . |
| 2580850 | 10/1986 | France . |
| 59-113509 | 6/1984 | Japan . |
| 60-121575 | 6/1985 | Japan . |

Primary Examiner—Donald McElheny, Jr.
Attorney, Agent, or Firm—Fitzpatrick, Cella, Harper & Scinto

[57] ABSTRACT

There is disclosed an information record method comprising the steps of recording information in one record area of an information record medium having a plurality of record areas, reproducing the recorded information and checking error thereof, and recording an indicia indicating absence of error at a portion of the record area in accordance with an error check result. An information record apparatus used for the above method comprises a device for recording information on an information record medium having a plurality of record areas, a device for moving the record device to a record area to which information is to be recorded, a device for reproducing the information recorded in the record area, a device for checking error based on the reproduced information, and a device for recording an indicia for indicating absence of error at a portion of the record area in accordance with error check result.

12 Claims, 12 Drawing Sheets

RECORD CONTROL SIGNAL

METHOD FOR RECORDING INDICIA FOR INDICATING PRESENCE OR ABSENCE OF ERROR IN MEDIUM AFTER ERROR CHECKING AND APPARATUS THEREFOR

BACKGROUND OF THE INVENTION

1. Field of the Invention

The present invention relates to a method for recording information on an information record medium having a plurality of records thereon and an apparatus therefor.

2. Related Background Art

Various media such as disk, card and tape types have been used as information record media to optically record information and read the recorded information. Of those, a card-like optical information record medium (optical card) is compact, light and easy to carry, and a large demand thereof is expected as a convenient large capacity information record medium.

Figure 1:
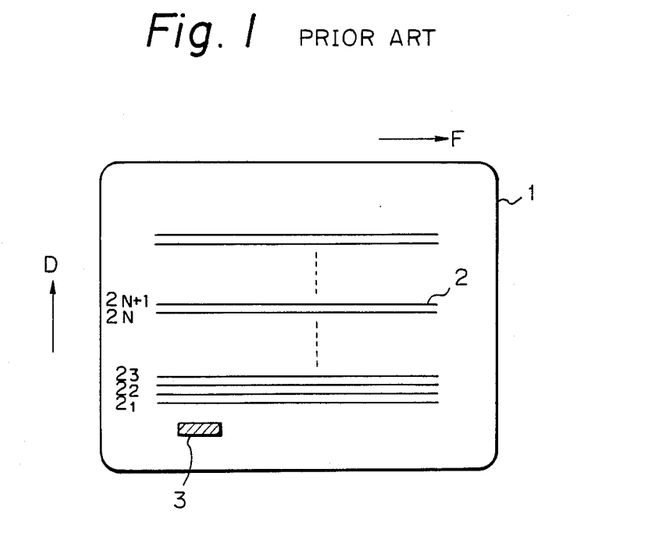
FIG. 1 shows a schematic plan view of a conventional optical card.
Figure 2:
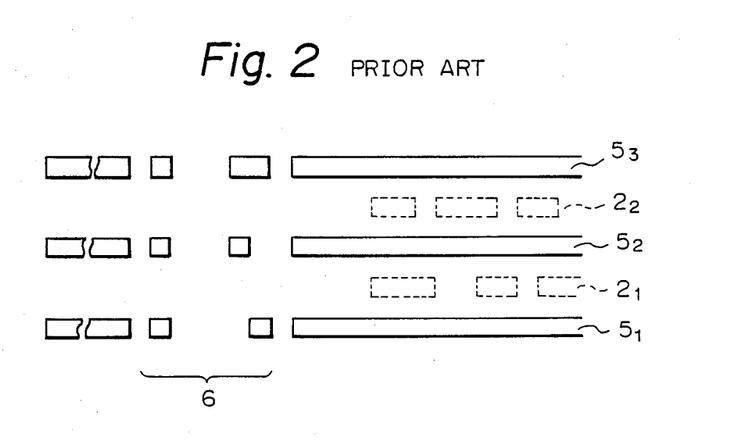
FIG. 2 shows a partial enlarged view thereof.

FIG. 1 shows a schematic plan view of an optical card, and FIG. 2 shows a partial enlarged view thereof.

In FIG. 1, numeral 1 denotes an optical card, numeral 2 denotes an information track, and numeral 3 denotes a home position. The optical card 1 is modulated with record information and a light beam focused into a fine spot is scanned on the optical card so that information is recorded as a record pit line (information track) which is optically detectable. In order to correctly record and reproduce information without trouble such as crossing of the information track 2, it is necessary to control the irradiation position of the light beam perpendicularly to a scan direction (autotracking AT). In order to irradiate the fine spot stably in spite of warp of the optical card or mechanical tolerance, it is necessary to control the irradiation position of the light beam normally to the optical card (auto-focusing AF). As shown in FIG. 2, tracking tracks 5 ($5_1$, $5_2$, . . . ) for AT are provided between the information tracks 2 ($2_1$, $2_2$, . . . ) of the optical card 1.

Recording and reproducing methods of the optical card are now explained.

In FIG. 1, the light beam is initially at the home position 3. Then, the light beam move in a direction D, finds an information track 2N to or from which information is to be recorded or reproduced, and scans the information track 2N in a direction F to record or reproduce information.

In order to determine whether the track is a target track or not, track number areas 6 (preformat) which prerecord track numbers are formed on extended lines of the tracking tracks 5 ($5_1$, $5_2$, . . . ), the recorded track number is read and the content thereof is checked to determine whether it is the target track or not. Alternatively, data plus a track number is recorded on the information track 2 ($2_1$, $2_2$, . . . ), the information track is reproduced and the track number is extracted and compared with the target track number. For example, the former method is described in U.S. patent application Ser. No. 846,888 filed on Apr. 1, 1986, now abandoned, and assigned to the assignee of the present invention.

However, in the former method, an application is restricted depending on the preformat. In the latter method, since no information is written on a non-recorded track, it is impossible to determine whether the track is the target information track or not, and it may be overwritten if it follows a recorded information track by error.

Where the optical information record medium is a non-erasable after-record type record medium, the recorded data is immediately reproduced, it is verified to determine whether it is identical to the record data, and if it is not identical, it is again recorded in the next information track. However, it may be possible that an error occurs when the information is reproduced from the information record medium. When the error occurs, it is impossible to determine whether it is due to dust or break in the reproduce operation or it has existed since the record operation. So-called retry to repeat the reproduction when the error occurs is usually carried out a plurality of times in the reproduce operation, and if the error still occurs, the information is reproduced from the next information track. However, if there are many error tracks in the record operation, the number of times of extra retries increases and a reproduce time is extended.

SUMMARY OF THE INVENTION

It is an object of the present invention to provide information record method which avoids overwriting and shortens a reproduce time, and apparatus therefor.

The above object of the present invention is achieved by an information record method comprising the steps of recording information in one record area of an information record medium having a plurality of record areas, reproducing the recorded information and checking error thereof, and recording an indicia indicating presence or absence of error at a portion of the record area in accordance with an error check result. An information record apparatus used for the above method comprises means for recording information on an information record medium having a plurality of record areas, means for moving the record means to a record area to which information is to be recorded, means for reproducing the information recorded in the record area, means for checking error based on the reproduced information, and means for recording an indicia for indicating presence or absence of error at a portion of the record area in accordance with error check result.

DETAILED DESCRIPTION OF THE PREFERRED EMBODIMENTS

The embodiments of the present invention will be explained with reference to the drawings. An optical card is explained as an example of an information record medium used in the present invention.

A basic structure of the optical card and a configuration of an information recording apparatus are explained. In the drawings, the like elements are designated by the like numerals.

Figure 3:
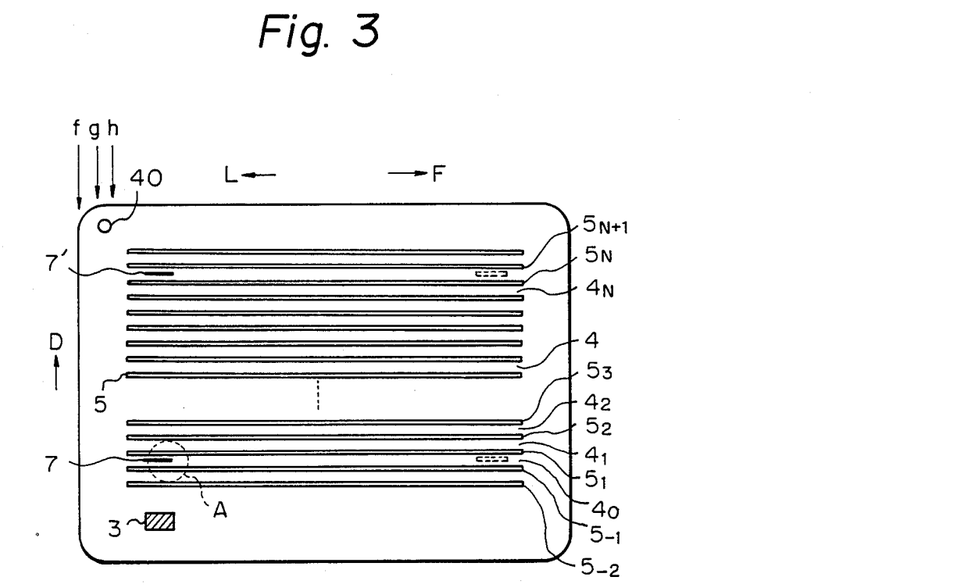
FIG. 3 shows a schematic plan view of an optical card used in the present invention.

FIG. 3 shows a schematic plan view of an optical card used in the present invention.

Tracking tracks 5 ($5_1$, $5_2$, ... ) of continuous line are arranged at a constant pitch on the optical card 1. A data record area 4 ($4_1$, $4_2$, ... ) for recording information thereon is provided for each space between the tracking tracks. Namely, the optical card 1 has data record areas in all spaces between the tracking tracks.

Figure 4:
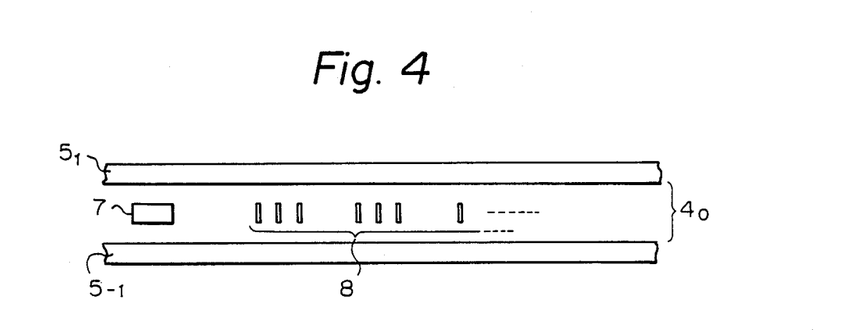
FIG. 4 shows a partial enlarged view of a section A of FIG. 3.

As shown in FIG. 4, a G mark 7 is provided between the tracking tracks $5_{-1}$ and $5_1$. The G mark 7 serves to discriminate a reference track and it is arranged by preformat at a predetermined position on the optical card. A medium type identification pattern 8 which is an auxiliary data area is recorded by preformat or light spot on a line extending from the data record area $4_0$ on which the G mark is provided. The medium type identification pattern 8 indicates a type of the optical card and information on modulation/demodulation system, data capacity per track and total number of tracks are recorded thereon. A format of the optical card is described in U.S. patent application Ser. No. 036,557, filed on Apr. 9, 1987, and assigned to the assignee of the present invention.

Figure 5:
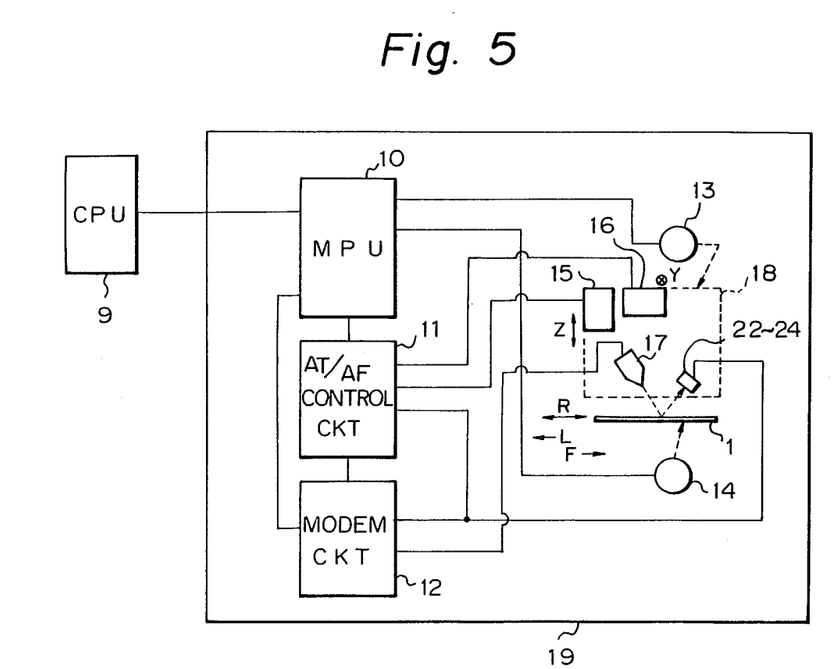
FIG. 5 shows one embodiment of an information record apparatus of the present invention.

FIG. 5 shows an embodiment of the information recording apparatus of the present invention.

The information recording apparatus (drive) 19 is connected to a host control unit (CPU) 9, and data are communicated and controlled between the drive 19 and the CPU 9. A microprocessing unit (MPU) 10 in the drive 19 contains a read-only memory (ROM) and a random access memory (RAM), and primarily controls a card feed motor 14 and a head drive motor 13 which drives an optical head 18. An AT/AF control circuit 11 receives signals of photo-detectors 22–24 to drive an AF actuator 15 and an AT actuator 16. A modem 12 modulates a light intensity of an irradiation optical system 17 in a record mode to record information and demodulates the information based on the signal of the photo-detector 23 in a reproduction mode. When the card is inserted, the MPU 10 demodulates and discriminates the medium type identification pattern 8 of the reference track shown in FIG. 4.

Figure 6:
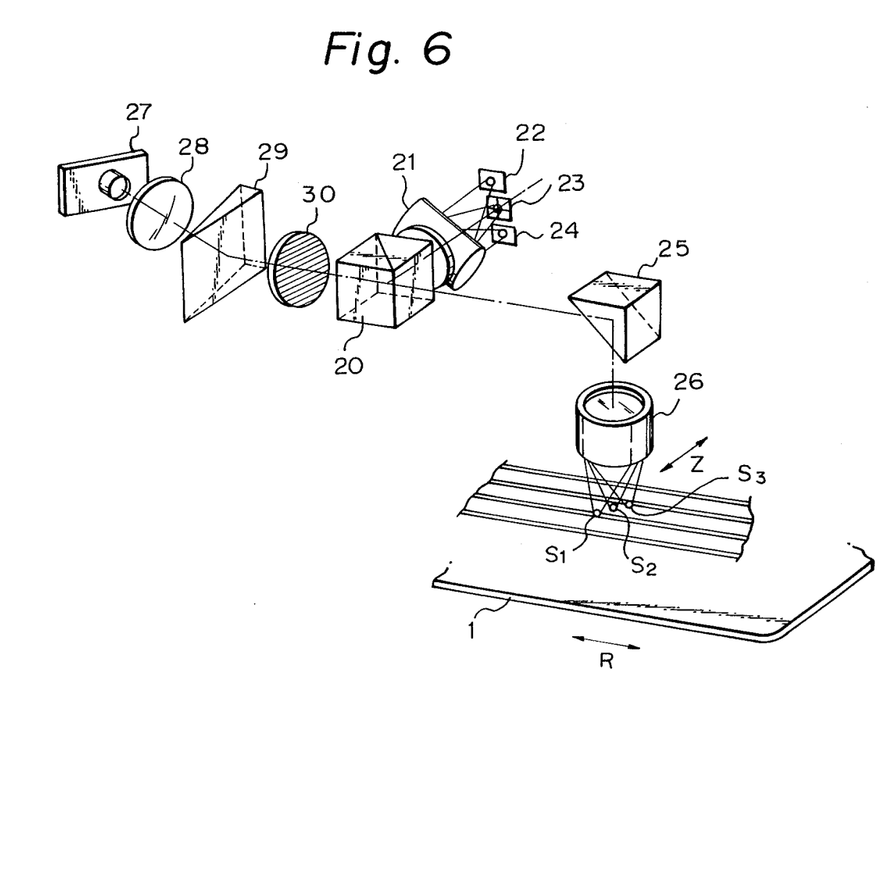
FIG. 6 shows an optical head of the information record apparatus.

FIG. 6 shows a construction of the optical head of the information recording apparatus.

Figure 7:
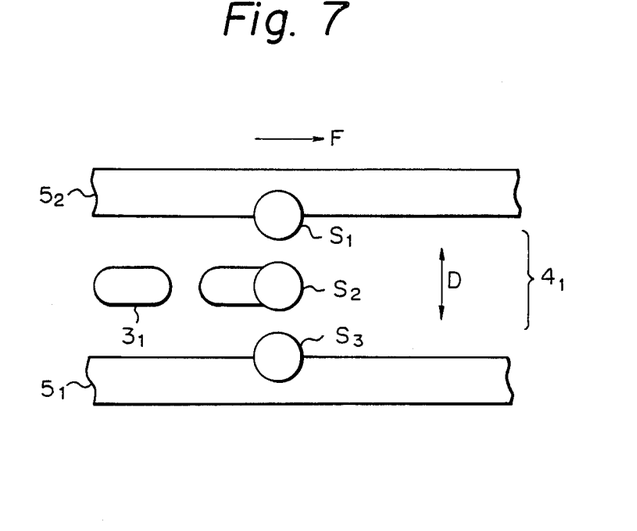
FIG. 7 shows a light beam irradiated on the optical card.

FIG. 7 shows a light beam irradiated onto the optical card.

Figure 8:
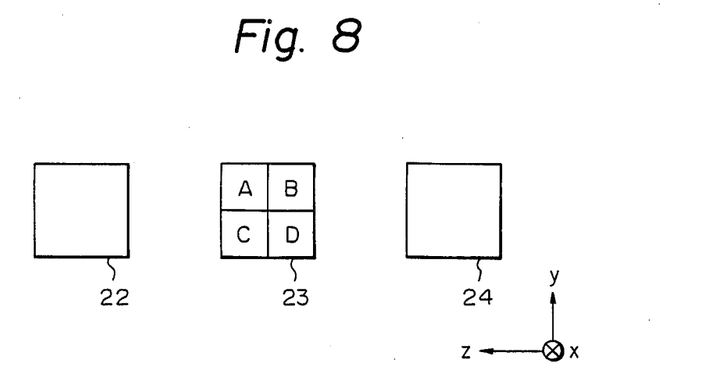
FIG. 8 shows a photo-detector.

FIG. 8 illustrates a function of the photo-detector.

The light beam emitted from a light source 27 such as a semiconductor laser is collimated by a collimater lens 28 and split into three beams by a diffraction grating 30. Those light beams are focused by an objective lens 26 onto the tracking tracks $5_1$ and $5_2$ and data record area $4_1$ on the optical card 1 to form beam spots $S_1$, $S_2$ nad $S_3$. The optical card 1 is moved in a direction R by the motor 14 shown in FIG. 5 and scanned by the beam spot along the tracking track. The reflected lights of the beam spots $S_1$, $S_2$ and $S_3$ again pass through the objective lens 26, reflected by a beam splitter 20 and projected to the photo-detectors 22, 23 and 24 by a focusing lens 21, which is an astigmatism system and arranged to effect auto-focusing by a well-known astigmatism system. The photo-detectors are arranged as shown in FIG. 8, and the photo-detector 23 is divided into four sections A, B, C and D as shown in FIG. 8. In FIG. 6, numeral 29 denotes a prism which converts a sectional distribution of the light beam emitted from the semiconductor laser and collimated from an ellipse to a circle, and numeral 25 denotes a mirror which directs the light beam to the objective lens 26.

An operation to record information on the optical card by using the above apparatus is explained.

When information is to be recorded on the data record area 41, the beam spots $S_1$, $S_2$ and $S_3$ are irradiated to the tracking track $5_2$, data record area $4_1$ and tracking track $5_1$, respectively. Those beam spots are scanned in a direction F as the optical card 1 is moved. The reflected light from the beam spot $S_1$ is directed to the photo-detector 22 and the reflected light from the beam spot $S_3$ is directed to the photo-detector 24, and the tracking signal is detected by a three-beam method. As the beam spots $S_1$ and $S_3$ deviate from the tracking tracks $5_2$ and $5_1$, respectively, a difference is caused between light intensities applied to the photo-detectors 22 and 24, and the tracking signal is derived by comparing the signals form the photo-sensing planes. The beam spots $S_1$, $S_2$ and $S_3$ are moved in union normally to the scan direction (in the direction D in FIG. 2) by tracking means 16 shown in FIG. 5 (for example, means for driving the objective lens 26 in a direction Z in FIG. 6) in accordance with the tracking signal so that AT is effected. Record pits 31 are recorded on the data record area $4_1$ along the tracking tracks $5_1$ and $5_2$ by the beam spot $S_2$. Such AT is described in U.S. patent application Ser. No. 033,789, filed on Apr. 3, 1987, and assigned to the assignee of the present invention.

The operation of information recording in according with the present invention is explained.

The present invention is characterized by recording a special indicia indicating presence or absence of error on an extended line of the information track after verification.

The special indicia for indicating the presence or absence of error may be recorded when the error is present (E indicia), recorded when the error is absent (V indicia), or E mark and V mark are selectively recorded.

A method for recording the E indicia as the special indicia and an effect thereof are explained.

Figure 9:
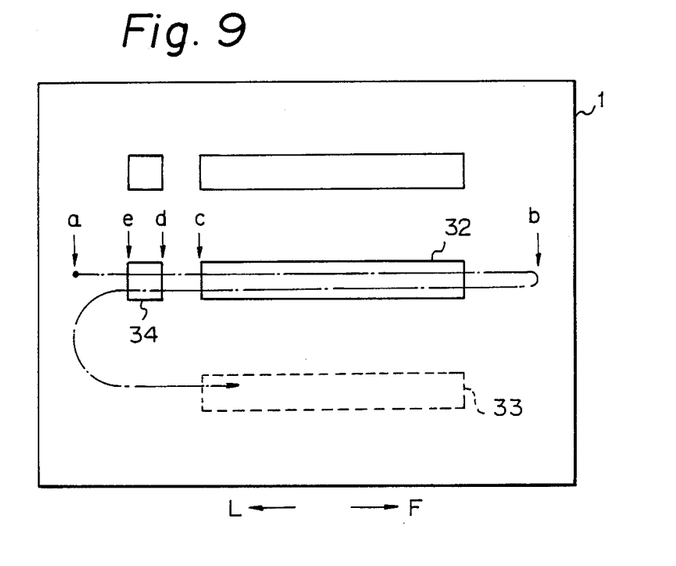
FIG. 9 illustrates record operation to the optical card by the information record apparatus of the present invention.

FIG. 9 shows the operation in the record mode of the optical card by the information recording apparatus of the present invention.

Figure 10A:
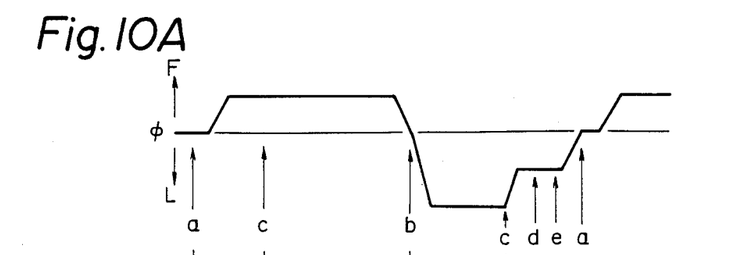
FIG. 10A shows a locus of a light beam spot in the record mode.

FIG. 10A shows a locus of a light beam spot in the record mode, in which an ordinate represents a velocity and F and L correspond to F and L in FIG. 7.

Figure 10B:
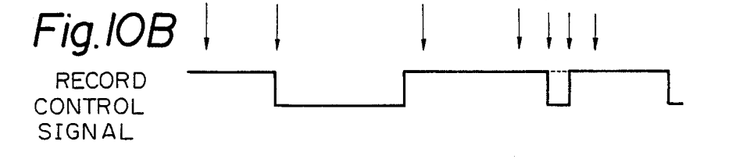
FIG. 10B shows a record timing.

FIG. 10B shows a record timing. A High level corresponds to a non-record area and a Low level corresponds to a record area.

Figure 11:
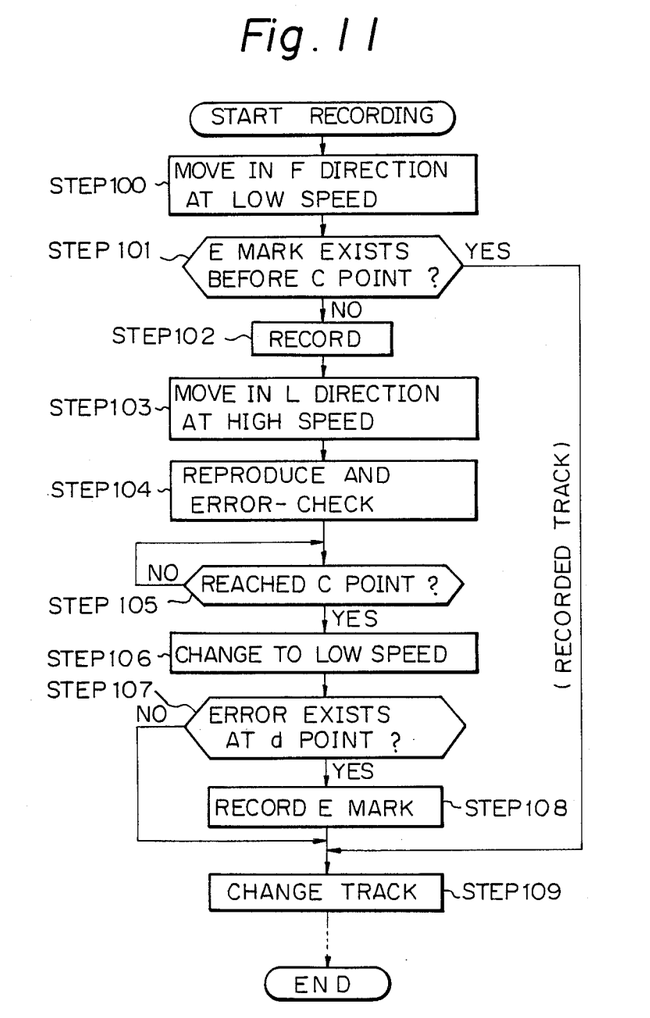
FIG. 11 shows a flow chart of a record operation in one embodiment when an E mark is used.

FIG. 11 shows a flow chart for illustrating the record operation. A direction F corresponds to a direction of movement of a light spot.

Referring to FIGS. 5 to 10B, the record operation is explained in accordance with the flow chart of FIG. 11.

In a step 100, the light spot at a point a on the track 32 in FIGS. 9, 10A and 10B is moved in the direction F at a low speed by driving the card feed motor 14. In a step 101, whether the E indicia is present or absent is checked based on the output signal of the photo-detector 23 before the light spot reaches a point c. If the signal by the E indicia is not produced, the light source 27 is driven by the modem 12 in a step 102 and information is recorded starting from the point c. When the information has been recorded and the light spot reaches a point b, the card feed motor 14 is reversed in a step 103 and the light spot is moved in the direction L at a high speed. The recorded information is reproduced through the modem 12 based on the output signal of the photo-detector 23 and the reproduced information is compared with the record information in the MPU 10 to check an error, in a step 104. After the light spot has reached the point c in the step 105, that is, after all data have been reproduced, the speed of movement of the light spot is lowered while the direction of movement is kept unchanged, in a step 106. If an error is detected in a step 107, a predetermined pattern or the E indicia is recorded in the record area 34 from the point d to the point e in a step 108. The E indicia is recorded by producing an E indicia record signal by the MPU 10 based on the result of error check by the MPU 10 and modulating the light source 27 by the modem 12 in accordance with the pattern. In a step 109, the head drive motor 13 is driven to move the head to the next track 33. If no error is detected in the step 107, no E indicia record signal is produced by the MPU 10 and no E indicia is recorded, and the head is moved to the track 33 in the step 109. If the E indicia is detected in the step 101, it means that the track 32 has information recorded thereon, and no information is recorded and the head is moved to the track 33 in the step 109. In any case, the track is switched one after another after the step 109 and the operation is repeated until all information have been recorded.

In accordance with the present invention, since recording and verification of the data and recording of the E indicia are done in one reciprocation along one information track, the record time can be shortened. As shown in FIG. 10B, the velocity in the record mode and the velocity in the reproduce mode are different although they may be equal.

Figure 12A:
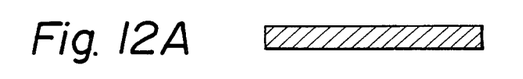
FIGS. 12A to 12C illustrate the E mark.
Figure 12B:
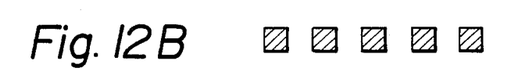
Figure 12C:
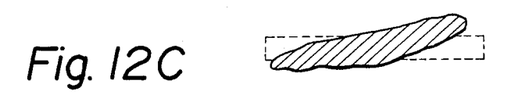

The E indicia is basically a single bar-like pattern as shown in FIG. 12A. However, if there is dust or defect (FIG. 12C) in a unrecorded area in which the E indicia is to be recorded, it may be detected as the E indicia so that even a good track may be detected as a bad track. In order to eliminate the above problem, the E indicia may be a multi-dot pattern as shown in FIG. 12B so that it may be discriminated from a signal due to dust or defect as shown in FIG. 12C.

Figure 13:
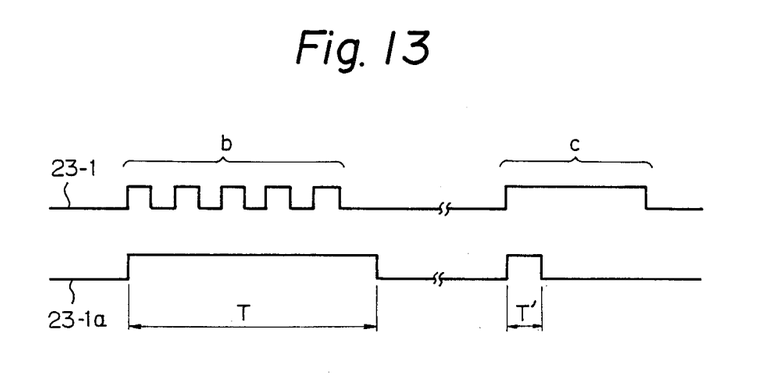
FIG. 13 shows a waveform to explain a detection operation of the E mark.

Referring to FIG. 13, when the E indicia is detected by the photo-detector 23, the output signal 23-1 of the photo-detector 23 comprises a portion b for the E indicia and a portion c for the dust or defect. When the output signal 23-1 is applied to a signal processing circuit (not shown), for example, a retriggerable monostable multivibrator, an output signal 23-1a shown in FIG. 13 is produced. Since the E indicia is the multi-dot pattern, a pulse width T of the signal in the portion b is wider than a pulse width T' of the signal in the portion c. By handling the signal as the signal due to the E indicia if the pulse width T is wider than a predetermined width, the E indicia (FIG. 12B) can be distinguished from the dust or defect (FIG. 12C).

The pattern of the V indicia and a method for detecting it are similar to those for the E indicia.

When there is no E indicia in the record mode, it means either that there is no error but the information has been recorded or that information has not been recorded. Accordingly, it may be difficult to completely prevents overwriting. When the E indicia and V indicia are selectively recorded depending on the presence or absence of error, non-error state, error state and non-record state can be discriminated.

In the reproduce mode, the operation when the light spot is at the point a at the start of the reproduction is slightly different than that when it is at the point b. When it is at the point a, if the signal due to the E indicia is detected before the light spot reaches the point c, the data is not reproduced and the track is changed at the point b to reproduce the next information track. On the other hand, if the light spot is at the point b, the process is carried out up to the error check, and if the E indicia is detected, the track is changed, whether an error exists or not, to reproduce the next information track. If there is an error inspite of no detection of the E indicia, the process is retried a predetermined number of times.

When a plurality of informaiton tracks are to be continuously reproduced, even if an information track containing an E indicia (bad track) is included, the bad track need not be retried. Accordingly, even if many bad tracks are included, the reproduce time is not substantially longer than that required when no bad track is included.

In accordance with the present invention, record/reproduce time can be significantly shortened through the simple control.

The same effect is attained when the V indicia is used instead of the E indicia.

Figure 14:
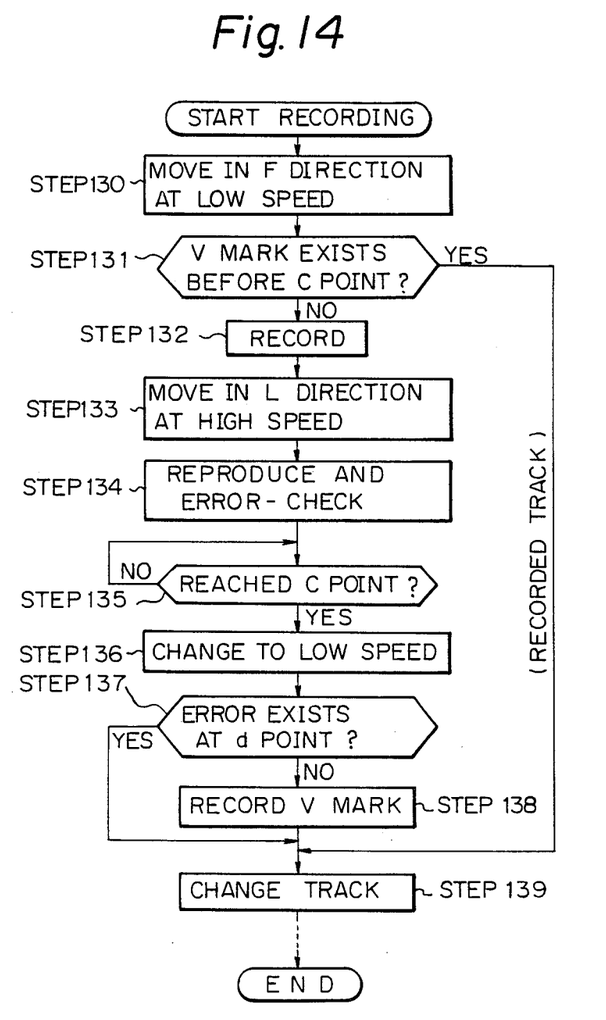
FIG. 14 shows a flow chart for a record operation in one embodiment when a V mark is used.

FIG. 14 shows a flow chart for illustrating the operation in the record mode when the V indicia is used.

In a step 130, the light spot at the point a on the track 32 in FIGS. 9, 10A and 10B is moved in the direction F at a low speed by driving the card feed motor 14. In a step 131, whether the V indicia is present or not before the light spot reaches the point c (detected by a position detector not shown or by time measurement) is detected from the output signal of the photo-detector 23. If the signal due to the V indicia is not produced, the light source 27 is activated by the modem 12 in a step 132 to record information starting from the point c. When the recording is completed and the light spot reaches the point b, the card feed motor 14 is reversed at a step 132 to move the light spot in the direction L at a high speed. During the movement of the light spot in the direction L, the recorded information is reproduced by the modem 12 based on the output signal of the photo-detector 23 in a step 134, and the reproduced information is compared with the record information in the MPU 10 to check an error. In a step 135, after the light spot has reached the point c, or all data have been reproduced in a step 135, the speed of the light spot is lowered while the direction is kept unchanged. If no error is detected in a step 137, a predetermined pattern or the V indicia is recorded in the record area 34 from the point d to the point e in a step 138. The V indicia is recorded by producing a V indicia record signal by the MPU 10 in accordance with a result of error check by the MPU 10 and modulating the light source 27 by the modem 12 in accordance with the pattern. In a step 139, the head drive motor 13 is energized to move the head to the next track 33. If an error is detected in the step 137, no V indicia record signal is produced by the MPU 10 and no V indicia is recorded. In a step 139, the head is moved to the track 33. If the V indicia is detected in the step 131, the track 32 is a recorded track and no information is recorded thereon. In the step 139, the head is moved to the track 33. In any case, after the step 139, the track is changed one after another and the operation is repeated until all information have been recorded.

As described above, the recording and verification of data and the recording of the V indicia are completed in one reciprocation on one track as are done for the E indicia, and the record time can be shortened. In FIG. 10B, the speed in the record mode and the speed in the reproduce mode are different although they may be equal.

In the reproduce mode, the operation when the light spot is at the point a at the start of reproduction is slightly different than that when it is at the point b. When it is at the point a, the data is not reproduced if the signal due to the indicia V is not detected before the light spot reaches the point c, and the track is changed at the point b to reproduce the next information track. On the other hand, if the light spot is at the point b, the process is carried out up to error check, and if the V indicia is not detected, the track is changed, whether an error is present or not, to reproduce the next information track. If an error is detected in spite of the detection of the V indicia, the process is retried a predetermined number of times.

Thus, when a plurality of information tracks are to be reproduced continuously, even if an information track which has no V indicia (bad track) is included, the bad track need not be retried. Accordingly, a reproduce time required when many bad tracks are included is not substantially longer then that required when no bad track is included.

Thus, the record/reproduce time can be significantly shortened by the simple control as is done for the E indicia. The verification of the record information is explained in U.S. patent application Ser. No. 850,830, filed on Apr. 11, 1986, and assigned to the assignee of the present invention.

The operation of the information recording apparatus upto the start of recording is explained with reference to FIGS. 3-5 and FIGS. 15A-17.

Figure 15A:
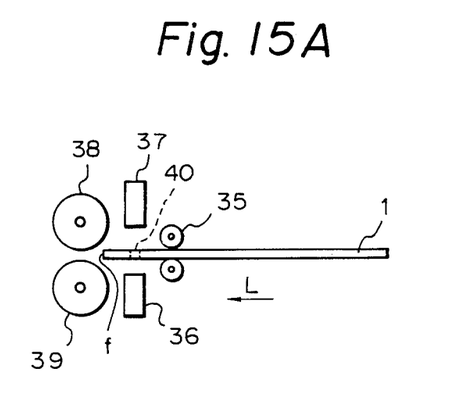
FIGS. 15A and 15B show a feed device for the optical card.
Figure 15B:
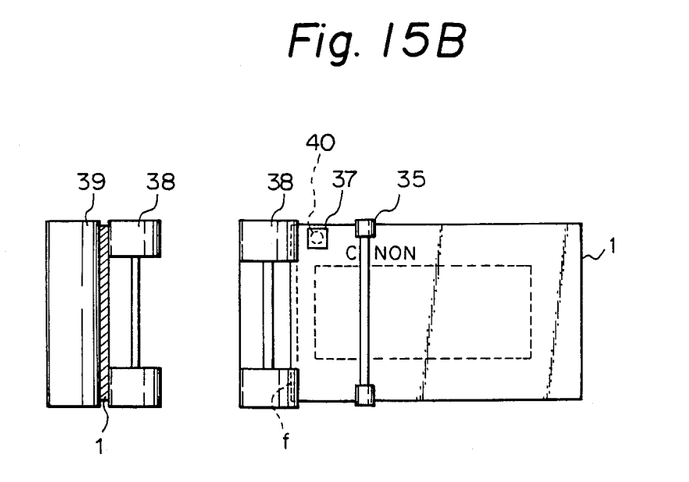

FIG. 15A shows a schematic sectional view of an optical card feed mechanism, and FIG. 15B shows front and plan views thereof.

Figure 16:
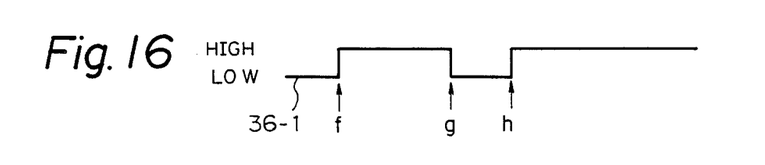
FIG. 16 shows a feed operation for the optical card.

FIG. 16 illustrates a method for determining a home position of the optical card.

Figure 17:
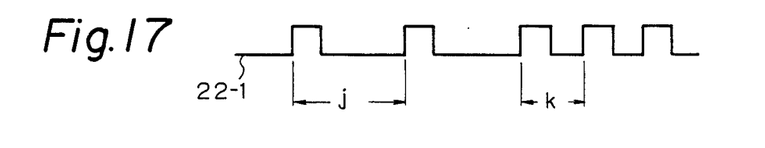
FIG. 17 illustrates a detection operation for a reference track.

FIG. 17 illustrates a reference track detection operation.

When the insertion of the optical card 1 into the drive 19 is detected by a sensor not shown, the card feed motor 14 is controlled to feed the optical card 1 in the direction L and the optical card 1 is fed in the direction L by a roller 35 as shown in FIGS. 15A and 15B. Numerals 38 and 39 denote rollers for supporting the optical card. A light emitting device 37 and a photo-sensor 36 are provided. As shown in FIG. 15, when a leading edge f of the optical card 1 passes through the photo-sensor 36, a signal 36-1 of the photo-sensor 36 is High at the point f, Low when a detection hole 40 passes, and again High at a point h after the detection hole has passed. By measuring distances or times of f-g and g-h by a position detector not shown, whether the optical card has been correctly inserted or not can be determined. If it has been correctly inserted, the optical card 1 is fed by a predetermined distance and stopped thereat. The stop position is the home position 3.

If the optical card has not been correctly inserted, the control circuit immediately reversely drive the feed roller 35 to eject the optical card 1 and requests re-insertion of the optical card to an operator by buzzer or lamp. A method for detecting the correct insertion of the optical card is described in U.S. patent application Ser. No. 042,246, filed on Apr. 24, 1987, U.S. Pat. No. 4,829,168, and assigned to the assignee of the present invention.

An operation to seek a reference track (track 00) is then carried out. When the light spot is at the home position 3 by the above operation, the MPU 10 drives the head feed motor 13 to move the optical pickup 18 in the direction D of FIG. 3. As shown in FIG. 17, if nothing has been recorded between the tracking tracks, an output 22-1 of the photo-detector 22 for a light spot $S_1$ represents a time j, and if information has been recorded therebetween, it represents a time k. The control circuit measures an interval for the light spot to move across the tracking track to seek the G indicia 7, or checks the presence or absence of the G indicia at a predetermined point on each track while the optical card 1 is fed in the direction L or F to seek the G indicia 7, and when the G indicia is sought, the head drive motor 13 is stopped and the optical card is returned in the direction F. Then, it is fed in the direction L to detect the G indicia again so that it is confirmed that the current information track is the track 00.

After the G indicia 7 has been detected, the optical card 1 is fed in the direction L (the light spot is moved in the direction F) and the MPU 10 reads the medium type identification pattern 8 (FIG. 3) recorded on the track 00. The type of medium applicable to the information recording and reproducing apparatus has been registered in a ROM of the MPU 10, and the MPU 10 determines whether the inserted optical card can be recorded and reproduced, and if it can, the identification information of the optical card is sent to the CPU 9, and if it cannot, the MPU 10 sends "record/reproduce disable" information to the CPU 9.

When it can be recorded and reproduced, the MPU 10 also informs to the CPU 9 that the unit is ready. The CPU 9 responds to it to send a record or reproduce instruction to the MPU 10. The reproduce operation is explained with reference to FIG. 9. When the light spot is at the point a, the optical card 1 is fed in the direction L (the light spot is moved in the direction F), and whether the E indicia or V indicia is detected before the light spot reaches the point c is checked and recorded. After the light spot has reached the point c, the demodulated data signal from the modem 12 is stored in the RAM of the MPU 10 and an error is checked. After all data of one information track have been stored and error-checked, the presence or absence of the E indicia or V indicia in the reproduced information track is checked based on the information stored in the RAM, and if the E indicia is absent and error is present, or if the V indicia is present and the error is present, the card feed direction is reversed and the reproduction is retried. If the E indicia is absent and error is absent, or if V indicia is present and error is absent, the track is changed in preparation for the next reproduce operation. The MPU 10 transfers the reproduced data to the CPU 9. When the E indicia is present or the V indicia is absent, the track is changed whether the error is present or not to reproduce the next track. By the E indicia or V indicia, it is possible to immediately determine whether a reproduction error is due to a record error or not. As a result, the retry operation is not necessary and the reproduction throughput is improved.

Figure 18:
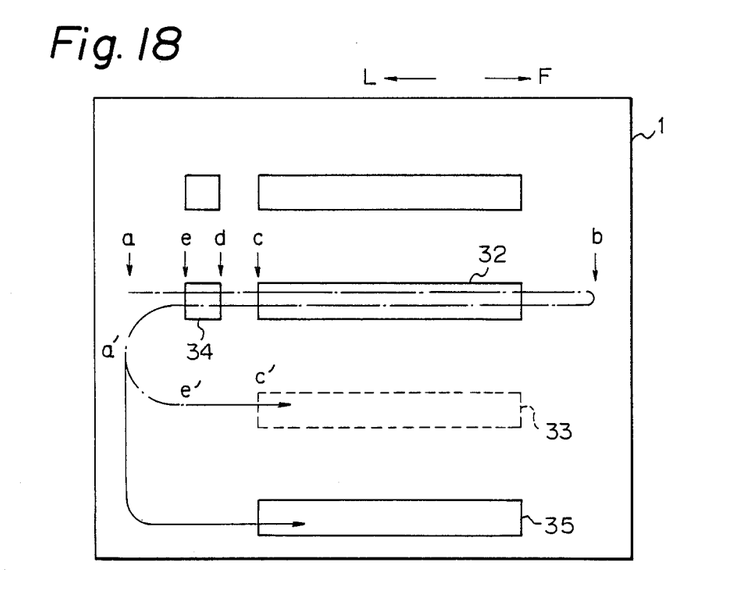
FIG. 18 illustrates other record operation in the present invention.

Other embodiment of the information recording method of the present invention is explained. FIG. 18 shows an enlarged view of a record medium plane, like FIG. 9. As explained in FIG. 14, when information is recorded on a track 32, if there is defect or dust on the record medium while the light spot is moved from a point a' to a point e', the AT is not effected and the light spot may return to the track 32. In the example of FIG. 18, an infinite loop of the track 32 a→e→d→c→b→a'→e→d may occur.

In the present embodiment, when the V indicia is detected, the light spot is moved from the track 32 to the track 35 so that the infinite loop is avoided.

While the light spot is moved across two tracks in the above example, it may be moved across more than two tracks, although the movement across many tracks is not desirable from a standpoint of ulitization efficiency of the tracks.

Figure 19:
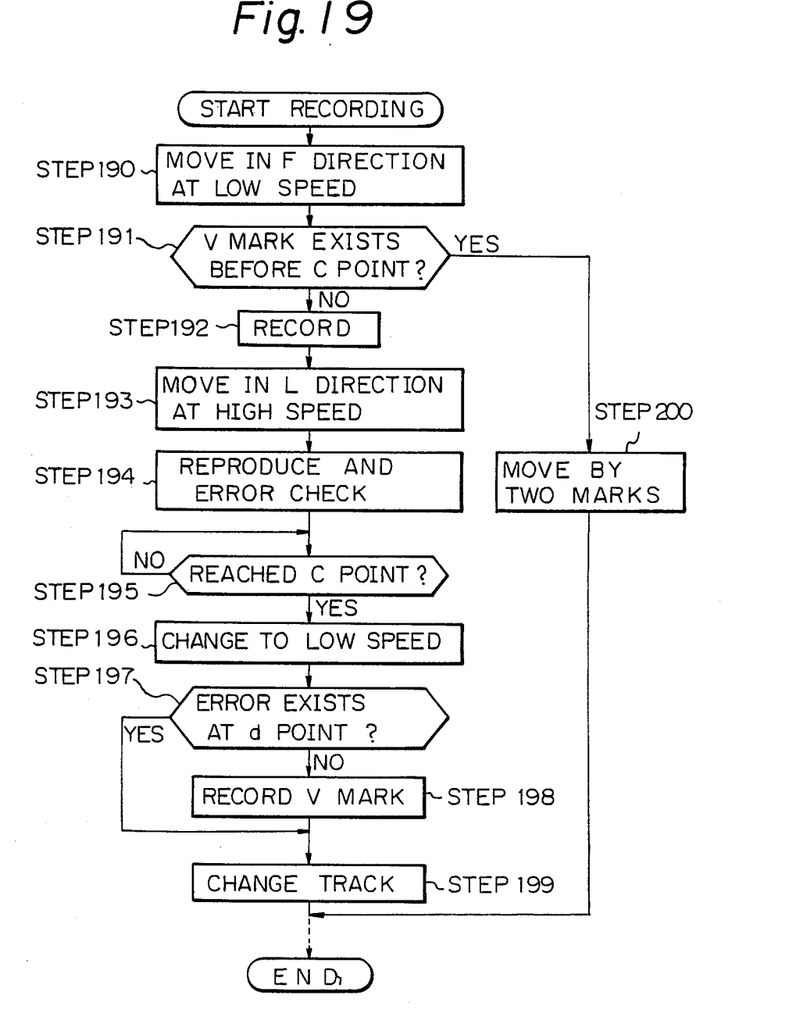
FIG. 19 shows a flow chart of the operation of FIG. 18.

Referring to FIGS. 5–10B and 18, the record operation of the present embodiment is explained with reference to a flow chart of FIG. 19.

In a step 190, the light spot at the point a on the track 32 in FIGS. 18, 10A and 10B is moved in the direction F at a low speed by driving the card feed motor 14. In a step 191, whether the V indicia is present or not before the light spot reaches the point c (detected by a position detector not shown or by time measurement) is detected based on the output signal of the photo-detector 23. If the signal due to the V indicia is not detected, the light source 27 is activated by the modem 12 in a step 192 and information is recorded starting from the point c. When the recording is completed and the light spot reaches the point b, the card feed motor 14 is reversed in a step 193 to move the light spot in the direction L at a high speed. While the light spot is moved in the direction L, the information recorded through the modem 12 is reproduced based on the output signal of the photo-detector 23 in a step 194, and the reproduced information is compared with the record information by the MPU 10 to check an error. When the light spot reaches the point c, that is, all data have been reproduced in a step 195, the velocity of the light spot is lowered while the direction is kept unchanged in a step 196. If error is not detected in a step 197, a predetermined pattern or the V indicia is recorded in the record area 34 from the point d to the point e in a step 198. The V indicia is recorded by producing the V indicia record signal from the MPU 10 based on the result of error check by the MPU 10 and modulating the light source 27 in accordance with the pattern by the modem 12. In a step 199, the head feed motor 13 is driven to move the head to the next track 33. When the error is detected in the step 197, the MPU 10 does not produce the V indicia record signal and the V indicia is not recorded. In a step 199, the head is moved to the track 33. If the V indicia is detected in the step 191, no information is recorded as the track 32 has information recorded thereon, and the head is moved to the track 35 in a step 200. In any case, the track is changed one after another and the operation is repeated until all information are recorded.

In accordance with the present embodiment, the infinite loop does not occur even if the AT is not effective because of dust or defect on the track.

The present invention may be applicable to other variations than the illustrated embodiments. For example, the record medium is not limited to the optical card but it may be of any form. The present invention includes all such modifications without departing from the scope of the claims.

What is claimed is:

1. A method for recording information comprising the steps of:
    recording information in a first recording area of an information recording medium, the information recording medium having a plurality of recording areas;
    reproducing the recorded information and error-checking the reproduced information; and
    recording an indicia indicating absence of error at a portion of the first recording area in accordance with the result of the error-checking step.

2. A method for recording information according to claim 1, further comprising the step of detecting presence or absence of the indicia in the first recording area prior to recording of the information and selecting a different recording area when the indicia is detected.

3. A method for recording information according to claim 2, wherein said plurality of recording areas include a plurality of tracks arranged in parallel on the medium, and selecting a recording track which is two tracks ahead of a first recording track when the indicia is detected in the first recording track.

4. A method for recording information according to claim 1 wherein said indicia is in a form of line.

5. A method for recording information according to claim 1 wherein said indicia is a series of dots.

6. A method for recording information according to claim 1, wherein the medium is a card-like optical recording medium.

7. An information recording apparatus comprising:
    recording means for recording information on an information recording medium having a plurality of recording areas;
    drive means for driving said recording means to one of the recording areas;
    reproducing means for reproducing the information recorded in the recording area
    error check means for checking an error of the reproduced information; and
    indicia recording means for recording an indicia indicating absence of error at a portion of the recording area in accordance with an output of said error check means.

8. An information recording apparatus according to claim 7, further comprising detection means for detecting presence or absence of the indicia in the recording area prior to recording of the information, and control means for activating said drive means in accordance with the output of said indicia detection means to drive said recording means to other recording areas.

9. An information recording apparatus according to claim 7, wherein the medium is an optical recording medium, and said recording means is an optical head including a light source and an optical system for focusing a light emitted from said light source onto the optical recording medium.

10. An information recording apparatus according to claim 9, wherein said reproducing means is a photo-detector for serving a light reflected by the optical recording medium.

11. An information recording apparatus according to claim 9, wherein the medium is card-like and the recording areas are tracks arranged in parallel on the medium.

12. An information recording apparatus according to claim 9 wherein said drive means is a head drive motor.

* * * * *